(12) United States Patent
Yanamala et al.

(10) Patent No.: US 11,907,347 B2
(45) Date of Patent: Feb. 20, 2024

(54) SYSTEM FOR SECURE VERIFICATION OF AUTHENTICATION DATA USING QUANTUM COMPUTING AND A DISTRIBUTED SERVER NETWORK

(71) Applicant: BANK OF AMERICA CORPORATION, Charlotte, NC (US)

(72) Inventors: Obi Reddy Yanamala, Hyderabad (IN); Ravi Ranjan Shandilya, Hyderabad (IN); Vinay Jaisinghani, Hyderabad (IN); Kumaresan Karuppiah, Chennai (IN); Samson Paulraj, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 367 days.

(21) Appl. No.: 17/352,659

(22) Filed: Jun. 21, 2021

(65) Prior Publication Data

US 2022/0405362 A1     Dec. 22, 2022

(51) Int. Cl.
*G06F 21/00*     (2013.01)
*G06F 21/32*     (2013.01)
*G06N 20/10*     (2019.01)
*G06N 10/00*     (2022.01)

(52) U.S. Cl.
CPC .............. *G06F 21/32* (2013.01); *G06N 10/00* (2019.01); *G06N 20/10* (2019.01)

(58) Field of Classification Search
CPC ........ G06F 21/32; G06N 10/00; G06N 20/10; G06N 10/60
See application file for complete search history.

(56) References Cited

U.S. PATENT DOCUMENTS

| | | |
|---|---|---|
| 8,176,563 B2 | 5/2012 | Redlich et al. |
| 8,621,508 B2 | 12/2013 | Rowe |
| 8,634,066 B1 | 1/2014 | Fraser |
| 8,706,914 B2 | 4/2014 | Duchesneau |
| 8,949,591 B2 | 2/2015 | Ovsiannikov |
| 9,311,499 B2 | 4/2016 | Redlich et al. |
| 9,774,401 B1 | 9/2017 | Borrill |
| 10,275,176 B1 | 4/2019 | Gold et al. |
| 10,574,461 B2 | 2/2020 | Hughes et al. |
| 10,936,238 B2 | 3/2021 | Power et al. |

(Continued)

*Primary Examiner* — Jeffrey C Pwu
*Assistant Examiner* — William A Corum, Jr.
(74) *Attorney, Agent, or Firm* — Moore & Van Allen PLLC; Seongun M. Hong

(57) ABSTRACT

A system is provided for secure verification of authentication data using quantum computing and a distributed server network. In particular, the system may store a reference set of authentication data associated with a user within a distributed server database in an encrypted form. Subsequently, when the system receives live set of authentication data associated with the user, the system may, using a quantum authenticator, compare the encrypted live set of authentication data with the encrypted reference set of authentication data for authorization purposes. The system may further comprise a quantum machine learning authorization engine which may track historical data and/or settings associated with the user to model and predict behavior patterns of the user. In this way, the system provides a secure and efficient way to perform authentication and/or authorization of the user.

20 Claims, 3 Drawing Sheets

(56) References Cited

U.S. PATENT DOCUMENTS

| | | | |
|---|---|---|---|
| 10,997,251 B2 | 5/2021 | Tran et al. | |
| 11,044,087 B2 | 6/2021 | Van Der Velden | |
| 11,288,530 B1* | 3/2022 | Genner | G06F 21/32 |
| 2017/0116403 A1 | 4/2017 | Bouse et al. | |
| 2018/0262489 A1* | 9/2018 | Wadley | H04L 63/083 |
| 2019/0068367 A1* | 2/2019 | Baughman | G06F 21/32 |
| 2019/0173854 A1 | 6/2019 | Beck | |
| 2019/0340136 A1 | 11/2019 | Irwin et al. | |
| 2019/0378142 A1* | 12/2019 | Darnell | H04L 9/3297 |
| 2020/0004939 A1* | 1/2020 | Streit | H04L 63/102 |
| 2020/0081648 A1 | 3/2020 | Bernat et al. | |
| 2020/0106605 A1 | 4/2020 | Mord et al. | |
| 2020/0311525 A1* | 10/2020 | Kachman | G06N 3/08 |
| 2020/0380154 A1 | 12/2020 | Jayachandran | |
| 2020/0382309 A1 | 12/2020 | Jayachandran | |
| 2021/0035002 A1* | 2/2021 | Hastings | G06F 15/16 |
| 2021/0044429 A1* | 2/2021 | Yang | H04L 9/30 |
| 2021/0152327 A1 | 5/2021 | Givental et al. | |
| 2022/0020009 A1* | 1/2022 | Yoon | G06Q 20/3821 |

* cited by examiner

SYSTEM FOR SECURE VERIFICATION OF AUTHENTICATION DATA USING QUANTUM COMPUTING AND A DISTRIBUTED SERVER NETWORK

FIELD OF THE INVENTION

The present disclosure embraces a system for secure verification of authentication data using quantum computing and a distributed server network.

BACKGROUND

There is a need for an efficient and secure way to perform authentication of a user.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

A system is provided for secure verification of authentication data using quantum computing and a distributed server network. In particular, the system may store a reference set of authentication data associated with a user within a distributed server database in an encrypted form. Subsequently, when the system receives live set of authentication data associated with the user, the system may, using a quantum authenticator, compare the encrypted live set of authentication data with the encrypted reference set of authentication data for authorization purposes. The system may further comprise a quantum machine learning authorization engine which may track historical data and/or settings associated with the user to model and predict behavior patterns of the user. In this way, the system provides a secure and efficient way to perform authentication and/or authorization of the user.

Accordingly, embodiments of the present disclosure provide a system for secure verification of authentication data using quantum computing and a distributed server network, the system comprising a memory device with computer-readable program code stored thereon; a communication device; and a processing device operatively coupled to the memory device and the communication device, wherein the processing device is configured to execute the computer-readable program code to receive, from a user, a reference set of authentication data; execute a feature extraction process on the reference set of authentication data to generate reference feature data; encrypt the reference feature data to generate encrypted reference authentication data; store the encrypted reference authentication data within a distributed register; receive, from a second user, a request to execute a user action and a live set of authentication data; execute the feature extraction process on the live set of authentication data to generate live feature data; encrypt the live feature data to generate encrypted live authentication data; authenticate the user by comparing, using a quantum authenticator, the encrypted live authentication data with the reference authentication data; and authorize, using a quantum machine learning authorization process, the request to perform the user action.

In some embodiments, authorizing the request to perform the user action comprises classifying, using a quantum support vector machine algorithm, one or more data points within historical data associated with the user; identifying one or more user-defined settings associated with the user; determining, that the request to perform the user action is consistent with the historical data associated with the user and the one or more user-defined settings associated with the user; and permitting the user action to be executed.

In some embodiments, authorizing the request to perform the user action comprises classifying, using a quantum support vector machine algorithm, one or more data points within historical data associated with the user; identifying one or more user-defined settings associated with the user; determining, that the request to perform the user action is inconsistent with the historical data associated with the user and the one or more user-defined settings associated with the user; and automatically blocking the user action from being executed.

In some embodiments, authenticating the user comprises detecting a match between the encrypted live authentication data and the encrypted reference authentication data; and based on detecting the match, identifying the second user as the user.

In some embodiments, authenticating the user comprises detecting a mismatch between the encrypted live authentication data and the encrypted reference authentication data; based on detecting the mismatch, identifying the second user is not the user; automatically blocking the user action from being executed.

In some embodiments, the reference set of authentication data and the live set of authentication data each comprise biometric identifier data.

In some embodiments, the feature extraction process comprises identifying and quantifying one or more characteristics of the biometric identifier data.

Embodiments of the present disclosure also provide a computer program product for secure verification of authentication data using quantum computing and a distributed server network, the computer program product comprising at least one non-transitory computer readable medium having computer-readable program code portions embodied therein, the computer-readable program code portions comprising executable portions for receiving, from a user, a reference set of authentication data; executing a feature extraction process on the reference set of authentication data to generate reference feature data; encrypting the reference feature data to generate encrypted reference authentication data; storing the encrypted reference authentication data within a distributed register; receiving, from a second user, a request to execute a user action and a live set of authentication data; executing the feature extraction process on the live set of authentication data to generate live feature data; encrypting the live feature data to generate encrypted live authentication data; authenticating the user by comparing, using a quantum authenticator, the encrypted live authentication data with the reference authentication data; and authorizing, using a quantum machine learning authorization process, the request to perform the user action.

In some embodiments, authorizing the request to perform the user action comprises classifying, using a quantum support vector machine algorithm, one or more data points within historical data associated with the user; identifying one or more user-defined settings associated with the user;

determining, that the request to perform the user action is consistent with the historical data associated with the user and the one or more user-defined settings associated with the user; and permitting the user action to be executed.

In some embodiments, authorizing the request to perform the user action comprises classifying, using a quantum support vector machine algorithm, one or more data points within historical data associated with the user; identifying one or more user-defined settings associated with the user; determining, that the request to perform the user action is inconsistent with the historical data associated with the user and the one or more user-defined settings associated with the user; and automatically blocking the user action from being executed.

In some embodiments, authenticating the user comprises detecting a match between the encrypted live authentication data and the encrypted reference authentication data; and based on detecting the match, identifying the second user as the user.

In some embodiments, authenticating the user comprises detecting a mismatch between the encrypted live authentication data and the encrypted reference authentication data; based on detecting the mismatch, identifying the second user is not the user; and automatically blocking the user action from being executed.

In some embodiments, the reference set of authentication data and the live set of authentication data each comprise biometric identifier data.

Embodiments of the present disclosure also provide a computer-implemented method for secure verification of authentication data using quantum computing and a distributed server network, the computer-implemented method comprising receiving, from a user, a reference set of authentication data; executing a feature extraction process on the reference set of authentication data to generate reference feature data; encrypting the reference feature data to generate encrypted reference authentication data; storing the encrypted reference authentication data within a distributed register; receiving, from a second user, a request to execute a user action and a live set of authentication data; executing the feature extraction process on the live set of authentication data to generate live feature data; encrypting the live feature data to generate encrypted live authentication data; authenticating the user by comparing, using a quantum authenticator, the encrypted live authentication data with the reference authentication data; and authorizing, using a quantum machine learning authorization process, the request to perform the user action.

In some embodiments, authorizing the request to perform the user action comprises classifying, using a quantum support vector machine algorithm, one or more data points within historical data associated with the user; identifying one or more user-defined settings associated with the user; determining, that the request to perform the user action is consistent with the historical data associated with the user and the one or more user-defined settings associated with the user; and permitting the user action to be executed.

In some embodiments, authorizing the request to perform the user action comprises classifying, using a quantum support vector machine algorithm, one or more data points within historical data associated with the user; identifying one or more user-defined settings associated with the user; determining, that the request to perform the user action is inconsistent with the historical data associated with the user and the one or more user-defined settings associated with the user; and automatically blocking the user action from being executed.

In some embodiments, authenticating the user comprises detecting a match between the encrypted live authentication data and the encrypted reference authentication data; and based on detecting the match, identifying the second user as the user.

In some embodiments, authenticating the user comprises detecting a mismatch between the encrypted live authentication data and the encrypted reference authentication data; based on detecting the mismatch, identifying the second user is not the user; and automatically blocking the user action from being executed.

In some embodiments, the reference set of authentication data and the live set of authentication data each comprise biometric identifier data.

In some embodiments, the feature extraction process comprises identifying and quantifying one or more characteristics of the biometric identifier data.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
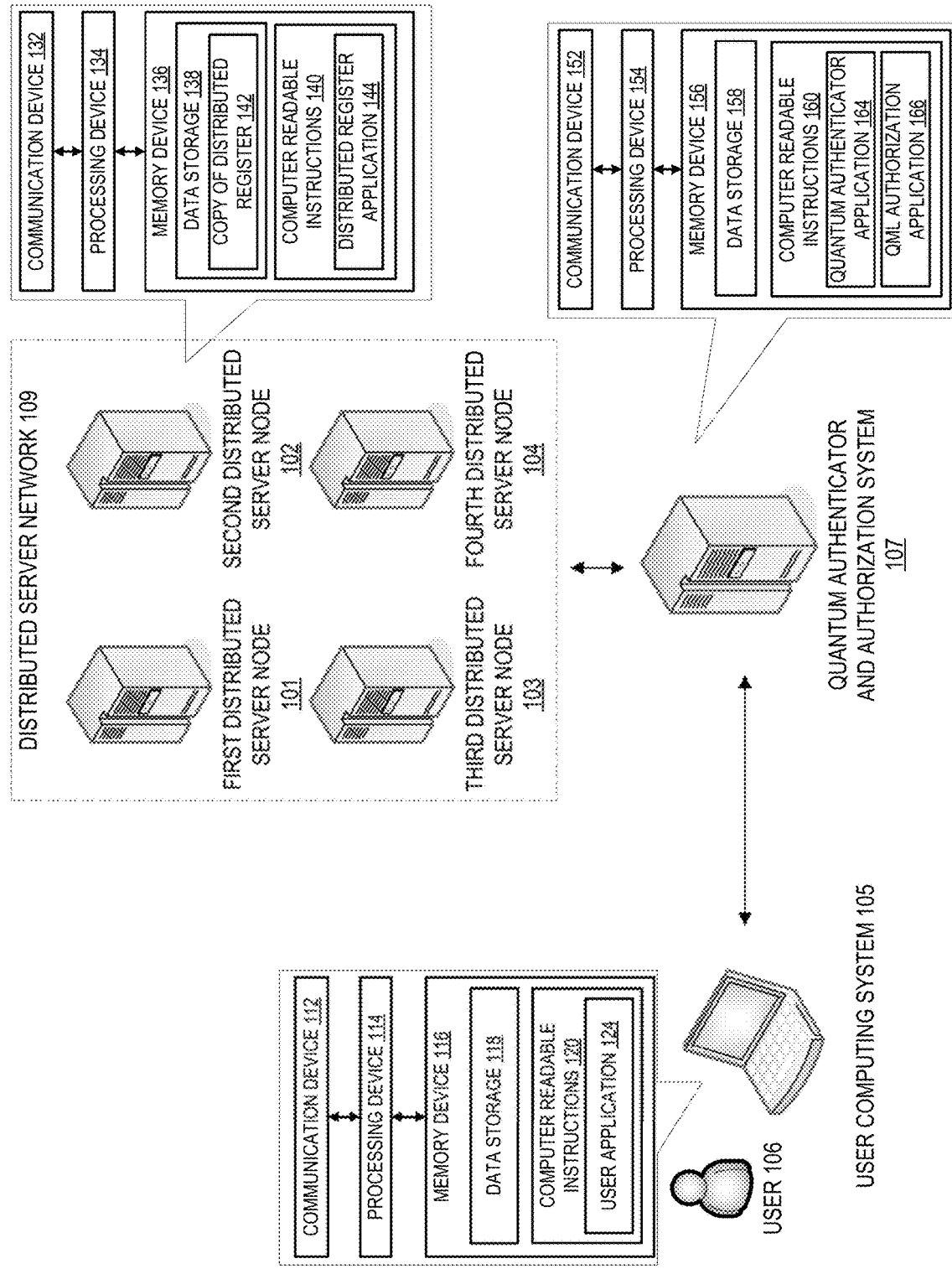
Figure 2:
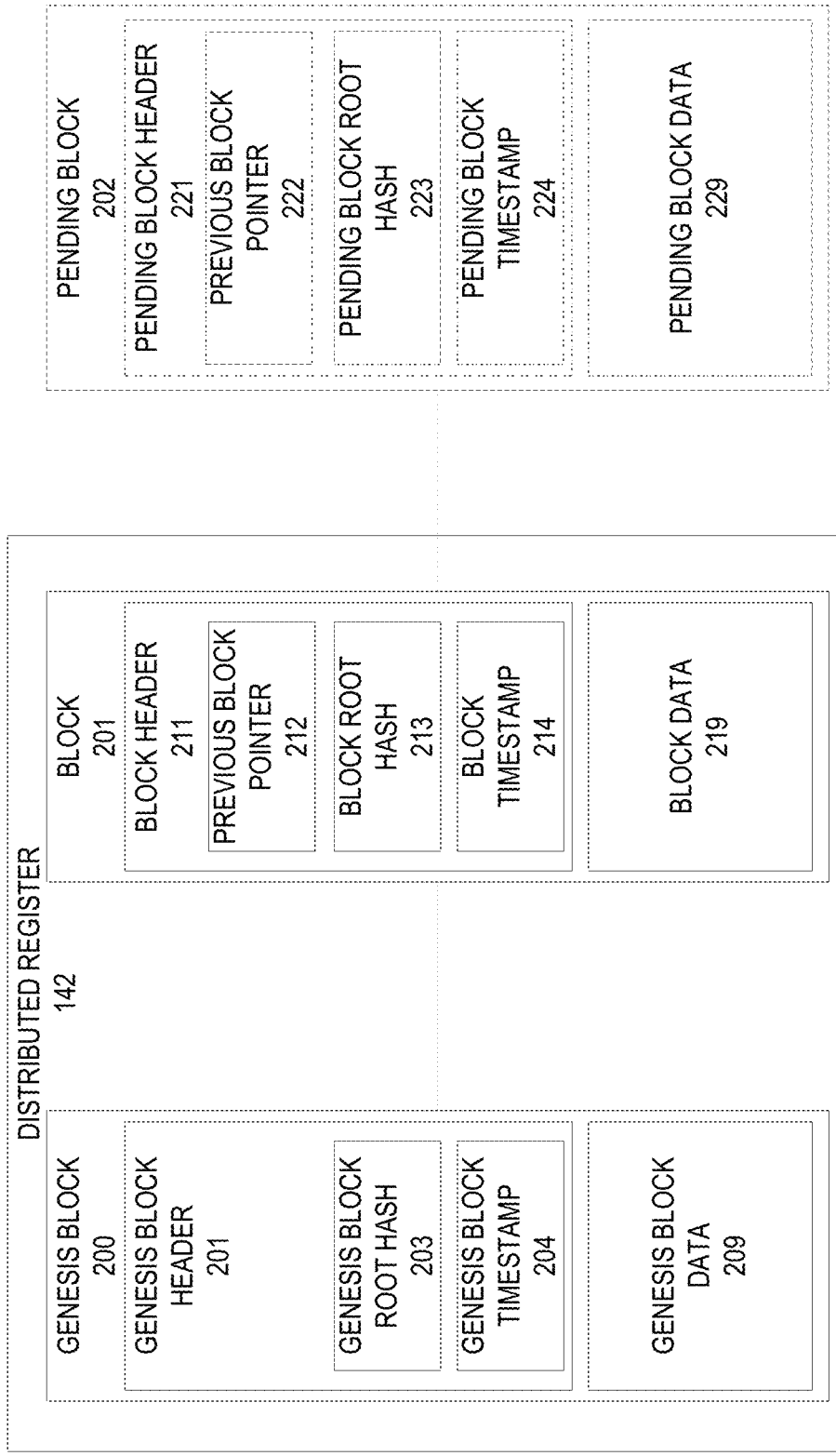
Figure 3:
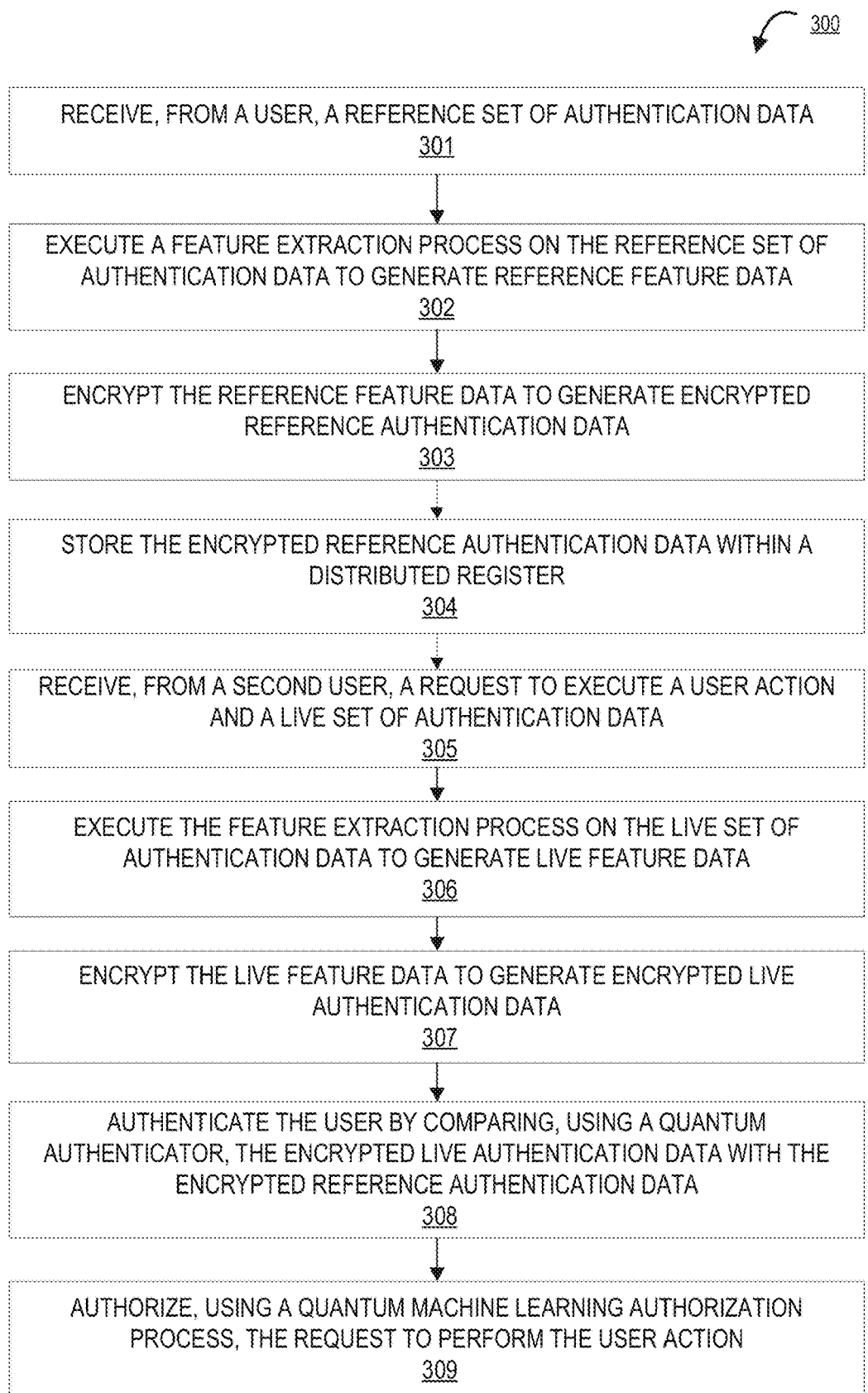

Having thus described embodiments of the invention in general terms, reference will now be made to the accompanying drawings, wherein:

FIG. 1 illustrates an operating environment for the distributed computer code synchronization system, in accordance with one embodiment of the present disclosure;

FIG. 2 is a block diagram illustrating the data structures within an exemplary distributed register, in accordance with one embodiment of the present disclosure; and FIG. 3 is a flow diagram illustrating a process for performing synchronization of computer code across multiple computing environments using a distributed register, in accordance with one embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization such as a financial institution, a non-profit organization, a government organization, and the like, which may routinely use various types of applications within its enterprise environment to accomplish its organizational objectives.

"The system" or "entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like. It should be understood that any computing system or device described herein may be a classical computing system (e.g., a computer that performs classical computations) or a quantum computing system (e.g., a computer that performs quantum computations).

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, as used herein the term "user device" or "mobile device" may refer to mobile phones, personal computing devices, tablet computers, wearable devices, and/or any portable electronic device capable of receiving and/or storing data therein.

"Distributed register," which may also be referred to as a "distributed ledger," as used herein may refer to a structured list of data records that is decentralized and distributed amongst a plurality of computing systems and/or devices. In some embodiments, the distributed ledger may use a linked block structure.

"Linked block," "linked block structure," or "blockchain" as used herein may refer to a data structure which may comprise a series of sequentially linked "blocks," where each block may comprise data and metadata. The "data" within each block may comprise one or more "data record" or "transactions," while the "metadata" within each block may comprise information about the block, which may include a timestamp, a hash value of data records within the block, and a pointer (e.g., a hash value) to the previous block in the linked block structure. In this way, beginning from an originating block (e.g., a "genesis block"), each block in the linked block structure is linked to another block via the pointers within the block headers. If the data or metadata within a particular block in the linked block structure becomes corrupted or modified, the hash values found in the header of the affected block and/or the downstream blocks may become mismatched, thus allowing the system to detect that the data has been corrupted or modified.

A "linked block ledger" may refer to a distributed ledger which uses linked block data structures. Generally, a linked block ledger is an "append only" ledger in which the data within each block within the linked block ledger may not be modified after the block is added to the linked block ledger; data may only be added in a new block to the end of the linked block ledger. In this way, the linked block ledger may provide a practically immutable ledger of data records over time.

"Permissioned distributed register" as used herein may refer to a linked block ledger for which an access control mechanism is implemented such that only known, authorized users may take certain actions with respect to the linked block ledger (e.g., add new data records, participate in the consensus mechanism, or the like). Accordingly, "unpermissioned distributed ledger" as used herein may refer to a linked block ledger without an access control mechanism.

"Private distributed register" as used herein may refer to a linked block ledger accessible only to users or devices that meet specific criteria (e.g., authorized users or devices of a certain entity or other organization). Accordingly, a "public distributed ledger" is a linked block ledger accessible by any member or device in the public realm.

"Node" as used herein may refer to a computing system on which the distributed ledger is hosted. In some embodiments, each node maintains a full copy of the distributed ledger. In this way, even if one or more nodes become unavailable or offline, a full copy of the distributed ledger may still be accessed via the remaining nodes in the distributed ledger system. That said, in some embodiments, the nodes may host a hybrid distributed ledger such that certain nodes may store certain segments of the linked block ledger but not others.

"Consensus," "consensus algorithm," or "consensus mechanism" as used herein may refer to the process or processes by which nodes come to an agreement with respect to the contents of the distributed ledger. Changes to the ledger (e.g., addition of data records) may require consensus to be reached by the nodes in order to become a part of the authentic version of the ledger. In this way, the consensus mechanism may ensure that each node maintains a copy of the distributed ledger that is consistent with the copies of the distributed ledger hosted on the other nodes; if the copy of the distributed ledger hosted on one node becomes corrupted or compromised, the remaining nodes may use the consensus algorithm to determine the "true" version of the distributed ledger. The nodes may use various different mechanisms or algorithms to obtain consensus, such as proof-of-work ("PoW"), proof-of-stake ("PoS"), practical byzantine fault tolerance ("PBFT"), proof-of-authority ("PoA"), or the like.

"Smart contract" as used herein may refer to executable computer code or logic that may be executed according to an agreement between parties upon the occurrence of a condition precedent (e.g., a triggering event such as the receipt of a proposed data record). In some embodiments, the smart contract may be self-executing code that is stored in the distributed ledger, where the self-executing code may be executed when the condition precedent is detected by the system on which the smart contract is stored.

"Quantum computer" as used herein may refer to any computer that utilizes the principles of quantum physics to perform computational operations. Several variations of quantum computer design are known, including photonic quantum computing, superconducting quantum computing, nuclear magnetic resonance quantum computing, and/or ion-trap quantum computing. Quantum computing involves theoretical computation systems that make direct use of quantum-mechanical phenomena, such as superposition and entanglement, to perform operations on data. Whereas common digital computing, otherwise referred to herein as classical computing, requires that the data be encoded into binary digits (i.e., bits), each of which is always in one of two definite states (0 or 1), quantum computation encode data onto quantum bits, referred to herein as qubits, which can be in superpositions of states. Unlike conventional bits, however, qubits exhibit quantum behavior, allowing the quantum computer to process a vast number of calculations simultaneously. A qubit can be formed by any two-state quantum mechanical system. For example, in some embodiments, a qubit may be the polarization of a single photon or the spin of an electron. Qubits are subject to quantum phenomena that cause them to behave much differently than classical bits. Quantum phenomena include superposition, entanglement, tunneling, superconductivity, and the like.

Two quantum phenomena are especially important to the behavior of qubits in a quantum computer: superposition and entanglement. Superposition refers to the ability of a quantum particle to be in multiple states at the same time. Entanglement refers to the correlation between two quantum particles that forces the particles to behave in the same way even if they are separated by great distances. Together, these two principles allow a quantum computer to process a vast number of calculations simultaneously.

In a quantum computer with n qubits, the quantum computer can be in a superposition of up to 2n states simultaneously. By comparison, a classical computer can only be in one of the 2n states at a single time. As such, a quantum computer can perform vastly more calculations in a given time period than its classical counterpart. For example, a quantum computer with two qubits can store the information of four classical bits. This is because the two qubits will be a superposition of all four possible combinations of two classical bits (00, 01, 10, or 11). Similarly, a three-qubit system can store the information of eight classical bits, four qubits can store the information of sixteen classical bits, and so on. A quantum computer with three hundred qubits could possess the processing power equivalent to the number of atoms in the known universe.

In this regard, quantum computing allows for a more robust computing environment, in which much larger volumes of data can be processed in much shorter periods of time than would otherwise be realized by a classical computer apparatus.

"Quantum algorithm" as used herein may refer to an algorithm comprising a model for quantum computation. Examples of quantum algorithms may include Shor's algorithm or Grover's algorithm.

"Quantum machine learning" as used herein may refer to a process for executing machine learning algorithms using quantum computers. In this regard, quantum machine learning may include the use of qubits and/or quantum operations to execute machine learning algorithms on data sets that would be impractical or unfeasible to process using classical computing systems (e.g., data sets including objects that are classified to the nth dimension).

A system is provided for secure verification of authentication data using quantum computing and a distributed server network. In particular, the system may use quantum computing in conjunction with a distributed register network to securely and efficiently authenticate a user and authorize certain user actions. In this regard, the system may comprise a distributed register on which authentication data is stored, a quantum authenticator which performs authentication of the user based on reference authentication data stored within the distributed register, and a quantum machine learning ("QML") based authorization engine (which may also be referred to herein as "QML authorization engine") which authorizes user actions based on predicted user models generated from historical data and/or user-configured settings.

A reference set of authentication data associated with a user may be stored within the distributed register in encrypted form, where the reference set of authentication data may comprise an initial set of authentication data that may be received from the user for the purposes of verifying and/or validating the identity of the user. For instance, examples of such authentication data may include identifying information such as biometric data (e.g., fingerprint data, facial feature data, iris data, or the like), a username and/or password, secure token, PIN, or the like, or any combination thereof. The features of such authentication data (e.g., the biometric data) may be extracted and subsequently encrypted to produce encrypted reference authentication data associated with the user. The encrypted reference authentication data may then be stored within a distributed register in an encrypted form. In order to protect the security of the authentication data therein, the encrypted reference authentication data may also remain in an encrypted form without being decrypted by the system.

Subsequently, the system may receive a request from a user (which in some embodiments may be the user who provided the initial set of authentication data) to execute a user action within the system. For instance, the user may transmit a request to execute a resource transfer (e.g., a transaction). Along with the request, the user may provide a "live" (or current) set of authentication data for authentication and/or authorization purposes. In this regard, the live set of authentication data may include the various types of identifying information as described above. The system may then extract the features of the live set of authentication data and encrypt the live set of authentication data. The quantum authenticator may, through quantum computing, compare the encrypted live authentication data with the encrypted reference authentication data. If a match is detected, the quantum authenticator may trigger the QML authorization engine to analyze the requested user action for authorization. However, if no match is detected, the quantum authenticator may trigger a re-authentication process (e.g., the user may be prompted to provide another set of authentication data). In other embodiments, upon failing to detect a match, the quantum authenticator may cause the user request to be rejected or blocked automatically.

The QML authorization engine may use quantum machine learning to generate a predicted user model for user actions taken within the system. In this regard, the system may analyze historical data associated with the user to detect patterns of user activity. For instance, such historical data may include information about resource transfers executed in the past (e.g., time of execution, location of execution, resource amount, source and/or destination information, or the like), IP addresses and/or location information, ID's used to log into the system (e.g., hardware/device ID's, MAC addresses, usernames, or the like), and the like. In some embodiments, the QML authorization engine may further analyze user-configured settings or parameters (e.g., resource transfer limits, authentication preferences, or the like). The user model may then be used by the QML authorization engine to determine whether the requested user action matches the user model generated by the quantum machine learning process. If a match is detected, the QML authorization engine may authorize the user action to be executed. In some embodiments, the system may be configured such that the user action, upon being authorized, is executed automatically by the system. On the other hand, if a mismatch is detected, the QML authorization engine may deny authorization of the user action.

An exemplary use case of the system follows. It should be understood that the use case is described only for the purposes of illustrating the system according to a particular embodiment and is not intended to restrict the scope of the disclosure provided. In one embodiment, a user may be a customer of an entity such as a financial institution. Accordingly, the entity may maintain a set of user records associated with the user, where the user records may include information such as a name, ID number, transaction record (e.g., transaction amounts, participants, dates and/or times, or the like), location data for the user and/or user device, user action records (e.g., log-in times and/or instances, devices associated with the user, inputs received from the user, application features and/or interface elements used by the user, or the like), user-defined settings (e.g., transaction limits, geographical limits, or the like), or the like. As part of an onboarding process, the user may provide a set of authentication data to the entity, where the authentication data may include biometric data (e.g., facial feature data, iris scan data, fingerprint data, voice data, or the like).

Upon receiving the biometric data, the entity system may perform feature extraction of the biometric data, through which the system may use one or more extraction algorithms to identify and extract certain key features of biometric data (e.g., fingerprint lines and/or ridges, audio frequencies and/or patterns, facial feature positioning, or the like) and encode the extracted features. The extracted features may then be encrypted and stored within a distributed register hosted on a plurality of nodes (e.g., distributed servers). The encrypted biometric data may remain in encrypted form so long as the biometric data is stored within the distributed register.

Subsequently, the user may submit a request to take a user action (e.g., execute a transfer of resources to a particular recipient). The system may receive a second set of authentication data, which may include a second set of biometric data, from the user. Once again, the system may extract the features from the second set of biometric data and encrypt the second set of biometric data using the same encryption algorithm that was used to encrypt the initial set of biometric data. The system may then use the quantum authenticator to verify the identity of the user by comparing the initial set of encrypted biometric data (which is stored within the distributed register) with the second (or "live") set of encrypted biometric data received from the user.

If a match is identified, the system may use the machine learning capabilities of the QML authorization engine to compare the requested transaction with historical data associated with the user. In this regard, the transaction may be compared against previous transactions executed by the user to determine whether the characteristics of the transaction (e.g., location, amount, recipient, or the like) are consistent with the characteristics of the previous transactions. In some embodiments, the QML authorization engine may further compare the transaction against various user-defined settings and/or preferences in determining whether to authorize the transaction. If the transaction is found by the QML authorization engine to be consistent with the historical data and the user-defined settings, the QML authorization engine may authorize the transaction and allow the transaction to be executed.

The system as described herein confers a number of technological advantages over conventional authentication systems. For instance, by using quantum computing and quantum machine learning capabilities, the system may be able to perform authentications that would otherwise be unfeasible using conventional computing systems (e.g., authentication using encrypted authentication data). Furthermore, by using a distributed data register, the system may provide a durable repository of information to protect sensitive authentication data provided by the user.

Turning now to the figures, FIG. 1 illustrates an operating environment 100 for the quantum authentication system, in accordance with one embodiment of the present disclosure. In particular, FIG. 1 illustrates a first distributed server node 101, a second distributed server node 102, a third distributed server node 103, and a fourth distributed server node 104 within a distributed server network 109, where each of the nodes 101, 102, 103 host a copy of a distributed register 142, as will be described in further detail below. A user computing system 105 and a quantum authenticator and authorization system 107 may each be communicatively coupled with one another and/or one or more of the nodes 101, 102, 103, 104 within the distributed server network 109. The nodes 101, 102, 103, 104 may further be communicatively coupled with one another such that each of the nodes may send data to and receive data from the other nodes within the distributed server network 109.

It should be understood that FIG. 1 illustrates only an exemplary embodiment of the operating environment 100, and it will be appreciated that the operating environment 100 may comprise fewer or greater numbers of computing systems than what is depicted in FIG. 1 in various different orientations and/or configurations. For example, though FIG. 1 depicts four distributed server nodes 101, 102, 103, 104, it is within the scope of the disclosure for the distributed server network 109 to comprise fewer nodes (e.g., two or three) or more nodes (e.g., four, five, and the like) depending on the particular implementation of the system as described herein. Similarly, though the user computing system 105 and quantum authenticator and authorization system 107 are each depicted in FIG. 1 as single units, the operating environment 100 may comprise multiple environment computing systems in communication with the nodes 101, 102, 103, 104. It should also be appreciated that one or more functions of the systems, devices, or servers as depicted in FIG. 1 may be combined into a single system, device, or server and/or performed by other computing systems. Furthermore, the functions of a single system, device, or server as depicted in FIG. 1 may be distributed across multiple computing systems. For instance, in some embodiments, the quantum authentication functions and the QML-based authorization functions of the quantum authenticator and authorization system 107 may be separated and/or distributed across a plurality of computing systems.

The network may be a system specific distributive network receiving and distributing specific network feeds and identifying specific network associated triggers. The network may include one or more cellular radio towers, antennae, cell sites, base stations, telephone networks, cloud networks, radio access networks (RAN), Wi-Fi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the first distributed node 101, second distributed server node 102, third distributed server node 103, and the fourth distributed server node 104 may form a cluster of nodes that may serve as a repository for user authentication data. Accordingly, each of the nodes 101, 102, 103, 104 may comprise a communication device 132, a processing device 134, and a memory device 136, where the processing device 134 is operatively coupled to the communication device 132 and the memory device 136. The processing device 134 uses the communication device 132 to communicate with the network and other devices on the network. As such, the communication device 132 generally comprises a modem, antennae, Wi-Fi or Ethernet adapter, radio transceiver, or other device for communicating with other devices on the network.

The memory device 136 of each of the nodes 101, 102, 103, 104 may comprise computer-readable instructions 140 and data storage 138, where the data storage 138 may comprise a copy of a distributed register 142. The distributed register (and the copy of the distributed register 142) may comprise a series of data records relevant to the objectives of an entity associated with the distributed server network 109. For instance, the distributed register may comprise authentication data received from a user (e.g., user biometric data) that may be stored in encrypted form. In this regard, the computer-readable instructions 140 may have a distributed register application 144 stored thereon, where the distributed register application 144 may allow the nodes 101, 102, 103, 104 to read data from the distributed register, submit data records to the distributed register, participate in consensus mechanisms, or the like as needed to perform the code analysis and synchronization processes described herein.

As further illustrated in FIG. 1, the user computing system 105 may be in operative communication with the nodes 101, 102, 103, 104 within the distributed server network 109 and/or the quantum authenticator and authorization system 107. The user computing system 105 may be a computing system owned and/or operated by a user 106, where the user may be a client of the entity. For instance, in some embodiments, the user computing system 105 may be a personal computing device associated with the user, such as a smartphone. In other embodiments, the user computing system 105 may be a computing system or terminal that is installed on the entity's premises to be operated by the user 105 or an associate of the entity.

Accordingly, the user computing system 105 may comprise a communication device 112, a processing device 114, and a memory device 116. In some embodiments, the user computing system 105 may comprise hardware and/or software components that allow the user computing system 105 to interface with the user 106. In such embodiments, the user computing system 105 may comprise a user interface comprising one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like).

As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The communication device 112, and other communication devices as described herein, may comprise a wireless local area network (WLAN) such as Wi-Fi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the systems described herein may also include a communication interface device that may be connected by a hardwire connection to the resource distribution device. The interface device may comprise a connector such as a USB, SATA, PATA, SAS or other data connector for transmitting data to and from the respective computing system.

The memory device 116 of the user computing system 105 may further comprise data storage 118 and computer-readable instructions 120 stored thereon. The computer-readable instructions 120 may comprise a user application 124 that may be a software application through which the user 106 may provide authentication data, submit requests to take certain user actions, and the like.

As illustrated in FIG. 1, the quantum authenticator and authorization system 107 may be a quantum computing system that may comprise components configured to perform quantum computations and execute processes based on quantum algorithms. Accordingly, the quantum authenticator and authorization system 107 may comprise a processing device 154 operatively coupled to a communication device 152 and a memory device 156. The memory device 156 may comprise data storage 158 and computer readable instructions 160 stored thereon, where the computer readable instructions 160 may comprise a quantum authenticator application 164. The quantum authenticator 164 may be an application that uses a quantum algorithm to compare live authentication data associated with a user with reference authentication data associated with the user. In some embodiments, the computer readable instructions 160 may further comprise a QML authorization application 166 that is configured to use quantum machine learning to authorize user actions based on historical user data and/or user settings or preferences.

The communication devices as described herein may comprise a wireless local area network (WLAN) such as Wi-Fi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the distributed register node 103 may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

FIG. 2 is a block diagram illustrating the data structures within an exemplary distributed register, in accordance with some embodiments. In particular, FIG. 2 depicts a plurality of blocks 200, 201 within the distributed register 142, in addition to a pending block 202 that has been submitted to be appended to the distributed register 142. The distributed register 142 may comprise a genesis block 200 that serves as the first block and origin for subsequent blocks in the distributed register 142. The genesis block 200, like all other blocks within the distributed register 142, comprise a block header 201 and block data 209. The genesis block data 209, or any other instances of block data within the distributed register 142 (or any other distributed register) may contain one or more data records. For instance, block data may comprise software source code, authentication data, transaction data, documents or other data containers, third party information, regulatory and/or legal data, or the like.

The genesis block header 201 may comprise various types of metadata regarding the genesis block data 209. In some embodiments, the block header 201 may comprise a genesis block root hash 203, which is a hash derived from an algorithm using the genesis block data 209 as inputs. In some embodiments, the genesis block root hash 203 may be a Merkle root hash, wherein the genesis block root hash 203 is calculated via a hash algorithm based on a combination of the hashes of each data record within the genesis block data 209. In this way, any changes to the data within the genesis block data 209 will result in a change in the genesis block root hash 203. The genesis block header 201 may further comprise a genesis block timestamp 204 that indicates the time at which the block was written to the distributed register 142. In some embodiments, the timestamp may be a Unix timestamp. In some embodiments, particularly in ledgers utilizing a PoW consensus mechanism, the block header 201 may comprise a nonce value and a difficulty value. The nonce value may be a whole number value that, when combined with the other items of metadata within the block header 201 into a hash algorithm, produces a hash output that satisfies the difficulty level of the cryptographic puzzle as defined by the difficulty value. For instance, the consensus mechanism may require that the resulting hash of the block header 201 falls below a certain value threshold (e.g., the hash value must start with a certain number of zeroes, as defined by the difficulty value).

A subsequent block 201 may be appended to the genesis block 200 to serve as the next block in the linked block structure. Like all other blocks, the subsequent block 201 comprises a block header 211 and block data 219. Similarly, the block header 211 comprise a block root hash 213 of the data within the block data 219 and a block timestamp 214. The block header 211 may further comprise a previous block pointer 212, which may be a hash calculated by combining the hashes of the metadata (e.g., the genesis block root hash 203, genesis block timestamp 204, and the like) within the block header 201 of the genesis block 200. In this way, the block pointer 212 may be used to identify the previous block (e.g., the genesis block 200) in the distributed register 142, thereby creating a "chain" comprising the genesis block 200 and the subsequent block 201.

The value of a previous block pointer is dependent on the hashes of the block headers of all of the previous blocks in the chain; if the block data within any of the blocks is altered, the block header for the altered block as well as all subsequent blocks will result in different hash values. In other words, the hash in the block header may not match the hash of the values within the block data, which may cause subsequent validation checks to fail. Even if an unauthorized user were to change the block header hash to reflect the altered block data, this would in turn change the hash values of the previous block pointers of the next block in the sequence. Therefore, an unauthorized user who wishes to alter a data record within a particular block must also alter the hashes of all of the subsequent blocks in the chain in order for the altered copy of the ledger to pass the validation checks imposed by the consensus algorithm. Thus, the computational impracticability of altering data records in a ledger in turn greatly reduces the probability of improper alteration of data records.

A pending block 202 or "proposed block" may be submitted for addition to the distributed register 142. The pending block 202 may comprise a pending block header 221, which may comprise a pending block root hash 223, a previous block pointer 222 that points to the previous block 201, a pending block timestamp 224, and pending block data 229. Once a pending block 202 is submitted to the system, the nodes within the system may validate the pending block 202 via a consensus algorithm. The consensus algorithm may be, for instance, a proof of work mechanism, in which a node determines a nonce value that, when combined with a hash of the block header 211 of the last block in the linked block structure, produces a hash value that falls under a specified threshold value. For instance, the PoW algorithm may require that said hash value begins with a certain number of zeroes. Once said nonce value is determined by one of the nodes, the node may post the "solution" to the other nodes. Once the solution is validated by the other nodes, the hash of the block header 211 is included in the pending block header 221 of the pending block 202 as the previous block pointer 222. The pending block header 221 may further comprise the pending block root hash 223 of the pending block data 229 which may be calculated based on the winning solution. The pending block 202 is subsequently considered to be appended to the previous block 201 and becomes a part of the distributed register 142. A pending block timestamp 224 may also be added to signify the time at which the pending block 202 is added to the distributed register 142.

In other embodiments, the consensus mechanism may be based on a total number of consensus inputs submitted by the nodes of the distributed register 142, e.g., a PBFT consensus mechanism. Once a threshold number of consensus inputs to validate the pending block 202 has been reached, the pending block 202 may be appended to the distributed register 142. In such embodiments, nonce values and difficulty values may be absent from the block headers. In still other embodiments, the consensus algorithm may be a Proof-of-Stake mechanism in which the stake (e.g., amount of digital currency, reputation value, or the like) may influence the degree to which the node may participate in consensus and select the next proposed block. In other embodiments, the consensus algorithm may be a Proof-of-Authority mechanism in which the identity of the validator itself (with an attached reputation value) may be used to validate proposed data records (e.g., the ability to participate in consensus/approval of proposed data records may be limited to approved and/or authorized validator nodes). In yet other embodiments, the consensus algorithm may comprise a manual node approval process rather than an automated process.

FIG. 3 is a flow diagram illustrating a process for authorizing and authenticating a user using quantum computing and a distributed register, in accordance with one embodiment of the present disclosure. The process begins at block 301, where the system receives, from a user, a reference set of authentication data. The reference set of authentication data may be an initial set of data that may establish the identity of the user. Accordingly, the reference set of authentication data may include biometric identifiers, identifying documents, username and/or password, PIN, secure token, or the like. The reference set of authentication data may be provided by the user to an entity during an initial interaction between the user and the entity (e.g., during onboarding of the user for subsequent access to products and/or services provided by the entity).

The process continues to block 302, where the system executes a feature extraction process on the reference set of authentication data to generate reference feature data. The feature extraction process may comprise one or more feature extraction algorithms to identify and/or quantify certain characteristics of the reference set of authentication data. For instance, if the reference set of authentication data comprises iris biometric data, the feature extraction algorithm may identify patterns (e.g., striations), hue, thickness and/or diameters, and other such characteristics about the iris biometric data that may be used to identify the user.

The process continues to block 303, where the system encrypts the reference feature data to generate encrypted reference authentication data. The reference set of authentication data and/or the generated reference feature data may be encrypted using one or more encryption algorithms to create an encrypted signature unique to the user. The encrypted reference authentication data may subsequently be compared to other instances of encrypted authentication data for the purposes of verifying the user while maintaining a high level of security and privacy with respect to the user's identifying data.

The process continues to block 304, where the system stores the encrypted reference authentication data within a distributed register. In this regard, the system may transmit a proposed data record comprising the encrypted reference authentication data to a plurality of nodes which host the distributed register. Through one or more consensus algorithms, each of the nodes may transmit consensus inputs to one another, where the consensus inputs may indicate an approval or rejection of the proposed data record. Accordingly, the consensus algorithms may include one or more validation checks on the reference authentication data within the proposed data record (e.g., to verify that the encrypted reference authentication data is valid). Once the nodes have reached a consensus, the encrypted reference authentication data may be permanently appended to the distributed register in the form of the proposed data record (which in some embodiments may be appended to the end of a linked block ledger within the distributed register).

The process continues to block 305, where the system receives, from a second user, a request to execute a user action and a live set of authentication data. The user action may be an action that may be taken with respect to the user and/or the entity's products or services as they relate to the user. For instance, the request to execute the user action may be a request to modify user-defined preferences or settings associated with the user. Accordingly, the system may attempt to determine whether the second user who has provided the live set of authentication data is the same user who provided the reference authentication data (e.g., authenticate and authorize the second user with respect to the user action). To this end, the system may request the second user to provide a live set of authentication data (e.g., authentication data provided extemporaneously with the request to execute the user action). Accordingly, in some embodiments, the system may require that the live set of authentication data comprise at least one type of authentication data in common with the reference set of authentication data. For instance, if the reference set of authentication data comprises fingerprint data, the system may request that the second user provide a "live" sample of fingerprint data.

The process continues to block 306, where the system executes the feature extraction process on the live set of authentication data to generate live feature data. Similar to how the system extracts features or characteristics from the reference set of authentication data, the system may run one or more feature extraction processes on the live set of authentication data to identify and quantify the characteristics of the live set of authentication data.

The process continues to block 307, where the system encrypts the live feature data to generate encrypted live authentication data. The live set of authentication data and/or the generated live feature data may be encrypted using one or more encryption algorithms. In particular, the one or more encryption algorithms used to encrypt the live feature data may be the same encryption algorithms used to encrypt the live feature data. Therefore, the live authentication data can be directly compared to the reference authentication data even when both the live authentication data and reference authentication data remain in encrypted form.

The process continues to block 308, where the system authenticates the user by comparing, using a quantum authenticator, the encrypted live authentication data with the encrypted reference authentication data. Through the use of quantum computing, the quantum authenticator may be able to directly compare encrypted sets of authentication data, whereas it may be unfeasible or impractical to perform such computations on classical computing systems. In this regard, the quantum authenticator may use one or more algorithms to compare the sets of authentication data (e.g., Grover's Search Algorithm) and verify whether the features as extracted and identified from the live set of authentication data are consistent with the features extracted and identified from the reference set of authentication data. If the features are determined to be consistent, the quantum authenticator may indicate that the user has been authenticated (e.g., the second user is the user who provided the reference data), and the user's identity has been established. If, on the other hand, a mismatch is detected, the system may prompt the second user to provide another set of authentication data. For instance, the system may prompt the second user to provide a second fingerprint sample in case the first fingerprint sample was incomplete or corrupted (e.g., the first fingerprint sample was smeared). In other embodiments, the system may prompt the second user to provide another type of authentication data that is different from the first live set of authentication data (e.g., if a fingerprint sample was initially provided, the system may prompt the user to provide a facial scan sample). In yet other embodiments, if the quantum authenticator fails to authenticate the user, the system may automatically block or reject the user action.

The process continues to block 309, where the system authorizes, using a quantum machine learning authorization process, the request to perform the user action. The QML authorization engine may use a quantum support vector machine algorithm that may classify objects to the n-th dimension. Accordingly, the QML authorization engine may analyze and classify data points within the historical data associated with the user on a far deeper level than would ordinarily be possible with classical computers. The QML authorization engine may, upon detecting that the user has been authorized, use such historical data associated with the user and/or user settings or preferences to determine whether the requested user action is consistent with such historical data and/or user settings. For instance, the QML authorization engine may determine that historical resource transfers initiated by the user have transfer amounts that fall within a certain range. If the requested user action is for a resource transfer that exceeds the identified range by a threshold amount, the QML authorization engine may determine that the requested user action is inconsistent with the historical data and/or user settings, and subsequently reject or block the requested user action automatically. Upon blocking or rejecting the requested user action, the system may transmit a notification of the rejection to the user computing system, where the notification may comprise information regarding why the requested user action was rejected. However, if the QML authorization engine determines that the requested user action is consistent with the historical user data and/or the user-defined settings, the QML authorization engine may authorize the requested user action. In this way, the system provides an expedient and secure way to authenticate users and authorize actions.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or shared hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for secure verification of authentication data using quantum computing and a distributed server network, the system comprising:
   a memory device with computer-readable program code stored thereon;
   a communication device; and
   a processing device operatively coupled to the memory device and the communication device, wherein the processing device is configured to execute the computer-readable program code to:
      receive, from a user, a reference set of authentication data;
      execute a feature extraction process on the reference set of authentication data to generate reference feature data;
      encrypt the reference feature data to generate encrypted reference authentication data;
      store the encrypted reference authentication data within a distributed register;
      receive, from a second user, a request to execute a user action and a live set of authentication data, wherein the user action comprises a resource transfer;
      execute the feature extraction process on the live set of authentication data to generate live feature data;
      encrypt the live feature data to generate encrypted live authentication data;
      authenticate the user by comparing, using a quantum authenticator, the encrypted live authentication data with the reference authentication data; and
      authorize, using a quantum machine learning authorization process, the request to perform the user action, wherein authorizing the request to perform the user action comprises:
         classifying, using a quantum support vector machine algorithm, one or more data points within historical data associated with the user, wherein the historical data comprises historical resource transfer information, the historical resource transfer information comprising a resource amount, a time of execution, a location of execution, source information, and destination information;
         identifying one or more user-defined settings associated with the user;
         determining whether the request to perform the user action is consistent with the historical data associated with the user and the one or more user-defined settings associated with the user; and
         based on determining whether the request to perform the user action is consistent with the historical data associated with the user and the one or more user-defined settings associated with the user, validating the user action.

2. The system according to claim 1, wherein validating the user action comprises permitting the user action to be executed.

3. The system according to claim 1, wherein validating the user action comprises automatically blocking the user action from being executed.

4. The system according to claim 1, wherein authenticating the user comprises:
   detecting a match between the encrypted live authentication data and the encrypted reference authentication data; and
   based on detecting the match, identifying the second user as the user.

5. The system according to claim 1, wherein authenticating the user comprises:
   detecting a mismatch between the encrypted live authentication data and the encrypted reference authentication data;
   based on detecting the mismatch, identifying the second user is not the user; and
   automatically blocking the user action from being executed.

6. The system according to claim 1, wherein the reference set of authentication data and the live set of authentication data each comprise biometric identifier data.

7. The system according to claim 6, wherein the feature extraction process comprises identifying and quantifying one or more characteristics of the biometric identifier data.

8. A computer program product for secure verification of authentication data using quantum computing and a distributed server network, the computer program product comprising at least one non-transitory computer readable medium having computer-readable program code portions embodied therein, the computer-readable program code portions comprising executable portions for:
   receiving, from a user, a reference set of authentication data;
   executing a feature extraction process on the reference set of authentication data to generate reference feature data;
   encrypting the reference feature data to generate encrypted reference authentication data;
   storing the encrypted reference authentication data within a distributed register;
   receiving, from a second user, a request to execute a user action and a live set of authentication data, wherein the user action comprises a resource transfer;
   executing the feature extraction process on the live set of authentication data to generate live feature data;
   encrypting the live feature data to generate encrypted live authentication data;
   authenticating the user by comparing, using a quantum authenticator, the encrypted live authentication data with the reference authentication data; and
   authorizing, using a quantum machine learning authorization process, the request to perform the user action, wherein authorizing the request to perform the user action comprises:
      classifying, using a quantum support vector machine algorithm, one or more data points within historical data associated with the user, wherein the historical data comprises historical resource transfer information, the historical resource transfer information comprising a resource amount, a time of execution, a location of execution, source information, and destination information;
      identifying one or more user-defined settings associated with the user;
      determining whether the request to perform the user action is consistent with the historical data associated with the user and the one or more user-defined settings associated with the user; and based on determining whether the request to perform the user action is consistent with the historical data associated with the user and the one or more user-defined settings associated with the user, validating the user action.

9. The computer program product of claim 8, wherein validating the user action comprises permitting the user action to be executed.

10. The computer program product of claim 8, wherein validating the user action comprises automatically blocking the user action from being executed.

11. The computer program product of claim 8, wherein authenticating the user comprises:
   detecting a match between the encrypted live authentication data and the encrypted reference authentication data; and
   based on detecting the match, identifying the second user as the user.

12. The computer program product of claim 8, wherein authenticating the user comprises:
   detecting a mismatch between the encrypted live authentication data and the encrypted reference authentication data;
   based on detecting the mismatch, identifying the second user is not the user; and
   automatically blocking the user action from being executed.

13. The computer program product of claim 8, wherein the reference set of authentication data and the live set of authentication data each comprise biometric identifier data.

14. A computer-implemented method for secure verification of authentication data using quantum computing and a distributed server network, the computer-implemented method comprising:
   receiving, from a user, a reference set of authentication data;
   executing a feature extraction process on the reference set of authentication data to generate reference feature data;
   encrypting the reference feature data to generate encrypted reference authentication data;
   storing the encrypted reference authentication data within a distributed register;
   receiving, from a second user, a request to execute a user action and a live set of authentication data, wherein the user action comprises a resource transfer;
   executing the feature extraction process on the live set of authentication data to generate live feature data;
   encrypting the live feature data to generate encrypted live authentication data;
   authenticating the user by comparing, using a quantum authenticator, the encrypted live authentication data with the reference authentication data; and
   authorizing, using a quantum machine learning authorization process, the request to perform the user action, wherein authorizing the request to perform the user action comprises:
      classifying, using a quantum support vector machine algorithm, one or more data points within historical data associated with the user, wherein the historical data comprises historical resource transfer information, the historical resource transfer information comprising a resource amount, a time of execution, a location of execution, source information, and destination information;
      identifying one or more user-defined settings associated with the user;
      determining whether the request to perform the user action is consistent with the historical data associated with the user and the one or more user-defined settings associated with the user; and
      based on determining whether the request to perform the user action is consistent with the historical data associated with the user and the one or more user-defined settings associated with the user, validating the user action.

15. The computer-implemented method of claim 14, wherein validating the user action comprises permitting the user action to be executed.

16. The computer-implemented method of claim 14, wherein validating the user action comprises automatically blocking the user action from being executed.

17. The computer-implemented method of claim 14, wherein authenticating the user comprises:
   detecting a match between the encrypted live authentication data and the encrypted reference authentication data; and
   based on detecting the match, identifying the second user as the user.

18. The computer-implemented method of claim 14, wherein authenticating the user comprises:
   detecting a mismatch between the encrypted live authentication data and the encrypted reference authentication data;
   based on detecting the mismatch, identifying the second user is not the user; and
   automatically blocking the user action from being executed.

19. The computer-implemented method of claim 14, wherein the reference set of authentication data and the live set of authentication data each comprise biometric identifier data.

20. The computer-implemented method of claim 19, wherein the feature extraction process comprises identifying and quantifying one or more characteristics of the biometric identifier data.

* * * * *